Nov. 22, 1932.　　F. TURZICKY　　1,888,643
BRAKING MECHANISM
Filed Aug. 19, 1929
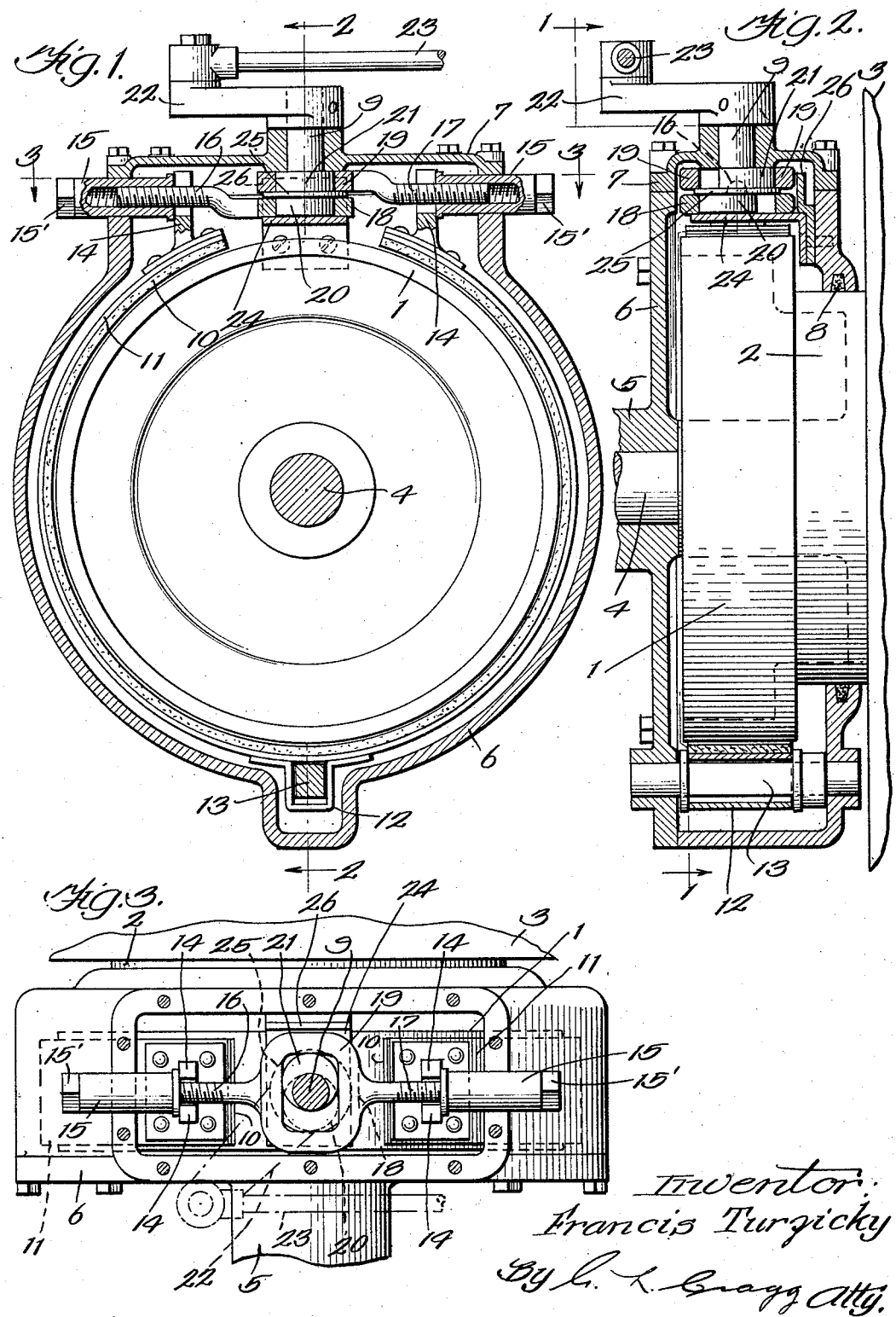
Inventor:
Francis Turzicky
By C. L. Gragg Atty.

Patented Nov. 22, 1932

1,888,643

UNITED STATES PATENT OFFICE

FRANCIS TURZICKY, OF CHICAGO, ILLINOIS, ASSIGNOR TO HENRY E. BULLOCK, OF CHICAGO, ILLINOIS

BRAKING MECHANISM

Application filed August 19, 1929. Serial No. 386,912.

My invention relates to braking mechanism of the type employing brake drums or turning members and brake shoes or straps which are brought into engagement with said drums or turning members to check their motion.

The invention has among its characteristics the provision of improved means for guiding the brake shoes or straps into and out of engagement with the drums or turning members; improved means for adjusting the relationship of the brake shoes or straps with respect to the mechanism which is employed to operate the same; the provision of a flexible connection between the brake shoes or straps and the means for actuating the same whereby the brake shoes or straps may automatically adapt themselves to the curvature of the turning members so that the braking influence of the brake shoes or straps is not impaired by the brake actuating mechanism as this mechanism is operated to apply the brakes; the provision of differentially related cams as a part of the operating mechanism and serving to effect the mutual approach or separation of the brake strap ends according to the direction in which these cams are turned; and the provision of a housing or casing for the brake members which affords access to the portion of the actuating mechanism where this mechanism is coupled with the brake shoe or strap.

The braking mechanism of my invention is of particular utility when employed in connection with automotive vehicles, although the invention is not to be limited to any particular use to which it may be put. When it is employed in connection with automotive vehicles the casing or housing is made imperforate to guard against the admission of dust, there being a dust guard interposed between the turning member or drum and the housing to guard against the access of foreign matter in this location.

The invention will be more fully explained in connection with the accompanying drawing in which Fig. 1 is a sectional elevation of the preferred embodiment of the invention, as employed in connection with automotive vehicles, this view being taken generally on line 1—1 of Fig. 2; Fig. 2 is a sectional view on line 2—2 of Fig. 1; and Fig. 3 is a sectional view on line 3—3 of Fig. 1.

The turning member illustrated is in the form of a drum having an annular portion 1 which constitutes one of the brake members, and a hub portion 2 by which said brake member is assembled with the vehicle wheel 3 or other rotating body whose rotation is to be checked by the braking mechanism. In the case of an automotive vehicle there is usually a housing which surrounds the driving shaft 4 which is coupled with the vehicle wheel 3. The housing which I employ is inclusive of the cylindrical or tubular member 5 and an enlargement 6 on this housing which constitutes the body portion of a casing that encloses the brake member 1 and a portion of the hub extension 2 of this brake member. The casing body 6 is provided with a closure 7, the entire casing being preferably substantially imperforate, openings therethrough for accommodation of the actuating mechanism and the guiding means being substantially sealed by the parts received thereby, so that the casing is substantially dust proof. To complete the dust proof nature of the casing, I provide an annular dust guard 8 which is pocketed within the casing body 6 and snugly engages the cylindrical surface of the hub 2. The housing 5 and its casing continuation 6 are suitably fixed and the closure 7 desirably serves as a bearing for the operating shaft 9 which extends from the exterior of the casing into the interior thereof, there to be in actuating relation with the brake strap or shoe 10, 11. The brake strap or shoe illustrated preferably extends almost completely about the brake drum 1 and is provided at its mid portion with a stirrup 12 which receives the anchoring bar 13 which is mounted, at its ends, in the side or flat walls of the casing body 6. The stirrup 12 is slightly longer vertically than the bar 13 so that the stirrup and with it the brake strap 11 has limited vertical movement on the bar 13. Thus when the brake strap is in released position it moves away from the brake beam 1 throughout the circumference of the brake strap and is supported by the bar 13. Conversely when the brake strap is contracted, as presently described, it moves toward the brake drum 1 throughout its circumference being guided in its movement by the movement of the stirrup 12 on the bar 13, the stirrup 12 being fixedly secured to the brake strap 11. The brake shoe is desirably inclusive of the brake pad or lining 10 and the resilient strip of metal 11 which carries the lining. Each of the two closely approached ends of the resilient strip 11 carries a yoke 14 which is in the form of a bifurcated post. These posts constitute members of flexible connections between the brake shoe and the actuating mechanism. In the embodiment of the invention illustrated, this actuating mechanism is inclusive of interiorly threaded aligned cylindrical abutment sleeves 15, which are snugly received within circular holes formed in the body portion 6 of the casing, these sleeves being slidable within these holes and with respect to said casing body portion which serves as a guide. Actuating rods 16, 17 have aligned threaded outer end portions which freely pass through the spaces that are provided between the sides of the guiding posts 14 and into threaded engagement with and within the sleeves 15. The inner ends of these rods terminate in rectangular frames 18 and 19. These rectangular frames surround the discs 20 and 21 which are engaged by the sides of the frames respectively pertaining thereto. These discs are carried by the shaft 9 and are eccentric with respect thereto and with respect to each other, the centers of the discs being on diametrically opposite sides of the axis of the shaft. The shaft 9, being journaled on the casing closure 7, is connected with suitable brake operating lever mechanism of which a crank 22 and an actuating rod 23 are shown, the crank being fixed upon the outer end of the shaft 9 and the rod being pivotally connected with the outer end of said crank. When the crank is turned the shaft 9 is turned. The discs 20 and 21 are normally disposed to have their centers aligned in parallelism with the opposed ends of the brake strap, in which position the said brake strap is expanded out of engagement with the brake drum and to the extent limited by the sliding engagement of the posts 14 with the inner ends of the sleeves 15. When the brake is to be applied, the shaft 9 is turned by the rod 23 and crank 22 to bring the discs 20 and 21 into diagonally or oblique relation to the opposed ends of the brake strap, the directions of movement of these discs being such that said discs will draw the ends of the brake strap toward each other to apply the brake upon the brake drum.

The rods 16, 17 effect application of the brakes by drawing the sleeves 15 inwardly to bring the inner ends of these sleeves against the outer faces of the bifurcated posts 14 to effect the desired contraction of the brake strap or shoe. When the discs are restored to their normal, brake releasing, position, the abutment sleeves 15 are positioned by the rods which in turn are positioned by the discs or eccentrics that are surrounded by the frames in which the inner ends of the rods terminate. The connections between the ends of the brake bands or strap and the operating rods 16 and 17 are flexible to permit said posts to move transversely of the rods and sleeves as these rods and sleeves are moved along their common axis in the operation and release of the brake. These structural characteristics permit the sleeves 15 to close the holes in the casing body 6 in which said sleeves are slidingly received, so as to maintain the dust proof character of the casing at this place. The brake strap or shoe is made adjustable with respect to the actuating mechanism that is to operate it by forming the sleeves 15 with wrench or tool engaging portions 15' that are accessible from the exterior of the casing.

The frame 18 is desirably slidably supported upon a shelf 24 which is secured to the inner face of one of the side walls of the casing body 6. A flange 25 is interposed between and is in fixed relation to the discs 20 and 21, and serve to support the frame 19. A guard 26 is also secured to the aforesaid wall of the casing body and cooperates with the opposite wall to prevent lateral movement, that is movement lengthwise of the shaft 4, of the frames.

While I have shown a single brake shoe or strap having both ends mutually approachable and separable and two actuating disc members 20 and 21, it is obvious that the invention need not be thus restricted.

It will be apparent to those familiar with the art that the braking mechanism of my invention possesses novel and advantageous characteristics which are clearly shown in the drawing and which have been set forth in the description.

Changes may be made without departing from the invention.

Having thus described my invention, I claim:

1. In a braking mechanism, a brake drum, a brake band, a cashing enclosing the drum and band, an abutment mounted on each end of the band, members slidably mounted on the casing for cooperation with said abutment respectively when moved toward each other to apply the band to the drum, said members and said abutments having relative movement transversely of the members, a pair of eccentrics rotatably mounted in the casing between said members, a connection between each eccentric and a related member responsive to simultaneous rotation of the eccentrics in one direction to draw the members toward each other and toward said eccentrics, and means for simultaneously rotating the eccentrics.

2. In a braking mechanism, a brake drum, a brake band, a casing enclosing the drum and band, an abutment mounted on each end of the band, members slidably and rotatably mounted on the casing for cooperation with said abutments respectively when moved toward each other to apply the band to the drum, said abutments being movable transversely of said members, a pair of eccentrics rotatably mounted in the casing between said members, a connection between each eccentric and a related member responsive to simultaneous rotation of the eccentrics in one direction to draw the members toward each other and toward said eccentrics, said connections having thread engagement in recesses in the members respectively to permit relative adjustment between each connection and its related member, and means for simultaneously rotating the eccentrics.

In witness whereof, I hereunto subscribe my name.

FRANCIS TURZICKY.